(12) United States Patent
Yu

(10) Patent No.: US 11,381,100 B2
(45) Date of Patent: Jul. 5, 2022

(54) METHOD FOR CONTROLLING MULTI-MODE CHARGING, MOBILE TERMINAL, AND STORAGE MEDIUM

(71) Applicant: HuiZhou TCL Mobile Communication Co., Ltd., HuiZhou (CN)

(72) Inventor: Lian Yu, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 43 days.

(21) Appl. No.: 16/646,590

(22) PCT Filed: Sep. 13, 2018

(86) PCT No.: PCT/CN2018/105570
§ 371 (c)(1),
(2) Date: Mar. 12, 2020

(87) PCT Pub. No.: WO2019/052514
PCT Pub. Date: Mar. 21, 2019

(65) Prior Publication Data
US 2020/0212701 A1    Jul. 2, 2020

(30) Foreign Application Priority Data
Sep. 13, 2017    (CN) .......................... 201710820594.4

(51) Int. Cl.
*H02J 7/00* (2006.01)

(52) U.S. Cl.
CPC .......... *H02J 7/0071* (2020.01); *H02J 7/0068* (2013.01)

(58) Field of Classification Search
CPC ........ H02J 7/0071; H02J 7/0068; H02J 50/80; H02J 7/007188; H02J 7/00034;
(Continued)

(56) References Cited

U.S. PATENT DOCUMENTS

| 5,955,869 A | * | 9/1999 | Rathmann | .......... | G01R 31/3648 320/132 |
| 6,025,695 A | * | 2/2000 | Friel | ................... | H02J 7/00036 320/106 |

(Continued)

FOREIGN PATENT DOCUMENTS

| CN | 1620796 | 5/2005 |
| CN | 104539005 | 4/2015 |

(Continued)

OTHER PUBLICATIONS

International Search Report and the Written Opinion dated Dec. 12, 2018 from the International Searching Authority Re. Application No. PCT/CN2018/105570 and Translation of Search Report Into English. (9 Pages).

*Primary Examiner* — Helen Rossoshek (57) ABSTRACT

Disclosed in the present invention are a method for controlling multi-mode charging, a mobile terminal, and a storage medium. The method comprises: pre-configuring multiple charging modes; connecting a charger, and receiving a user operation instruction, the operation instruction comprising a mode selection instruction; configuring and starting a timer according to a preset charging mode and the received operation instruction; and disabling or enabling a charging function when the time period set in the timer has passed.

8 Claims, 2 Drawing Sheets

(58) Field of Classification Search
CPC ...... H02J 7/007; H02J 7/0048; H02J 7/00036; Y02E 60/10; H01M 10/44
See application file for complete search history.

(56) References Cited

U.S. PATENT DOCUMENTS

| | | | | |
|---|---|---|---|---|
| 6,313,612 | B1* | 11/2001 | Honda | H02J 7/342 |
| | | | | 320/139 |
| 6,316,909 | B1* | 11/2001 | Honda | G04C 10/00 |
| | | | | 320/108 |
| 7,723,948 | B2* | 5/2010 | Minamiura | H01M 16/006 |
| | | | | 320/101 |
| 8,674,842 | B2* | 3/2014 | Zishaan | F24F 11/30 |
| | | | | 340/627 |
| 8,769,327 | B2* | 7/2014 | Lu | H04L 12/2836 |
| | | | | 713/324 |
| 8,816,644 | B2* | 8/2014 | Pisharodi | H02J 7/027 |
| | | | | 320/149 |
| 9,041,346 | B2* | 5/2015 | Nakama | H02J 7/00047 |
| | | | | 320/108 |
| 9,160,182 | B2* | 10/2015 | Keating | H02J 7/0027 |
| 9,806,547 | B2* | 10/2017 | Carre | H02J 7/0068 |
| 10,075,017 | B2* | 9/2018 | Leabman | H01Q 1/243 |
| 2002/0077079 | A1* | 6/2002 | Ishihara | H04M 1/67 |
| | | | | 455/410 |
| 2005/0040790 | A1 | 2/2005 | Ito et al. | |
| 2013/0049700 | A1* | 2/2013 | Pisharodi | H01R 31/065 |
| | | | | 320/148 |
| 2013/0082662 | A1* | 4/2013 | Carre | H02J 7/00 |
| | | | | 320/134 |
| 2013/0134940 | A1* | 5/2013 | Tominaga | B60L 53/65 |
| | | | | 320/109 |
| 2016/0046199 | A1* | 2/2016 | Butler | H02J 7/00036 |
| | | | | 320/106 |
| 2017/0133842 | A1* | 5/2017 | Freeman | H02J 1/00 |
| 2018/0076634 | A1 | 3/2018 | Zhang | |
| 2018/0131204 | A1* | 5/2018 | Weicker | B60L 58/15 |
| 2018/0241255 | A1* | 8/2018 | Leabman | H02J 50/23 |
| 2019/0050037 | A1* | 2/2019 | Wang | G06F 1/266 |
| 2019/0334354 | A1* | 10/2019 | Mizukami | H02J 7/007 |
| 2020/0076223 | A1* | 3/2020 | Kuriki | H02J 7/0021 |

FOREIGN PATENT DOCUMENTS

| | | | | |
|---|---|---|---|---|
| CN | 106340691 | | 1/2017 | |
| CN | 106340691 A | * | 1/2017 | ............ H01M 10/44 |
| CN | 106848457 | | 6/2017 | |
| CN | 106848457 A | * | 6/2017 | ............. H02J 7/007 |
| CN | 107681713 | | 2/2018 | |
| WO | WO 2019/052514 | | 3/2019 | |

* cited by examiner

METHOD FOR CONTROLLING MULTI-MODE CHARGING, MOBILE TERMINAL, AND STORAGE MEDIUM

RELATED APPLICATIONS

This application is a National Phase of PCT Patent Application No. PCT/CN2018/105570, which claims the benefit of priority of Chinese Patent Application No. 201710820594.4, filed on Sep. 13, 2017. The contents of the above applications are all incorporated by reference as if fully set forth herein in their entirety.

FIELD AND BACKGROUND OF THE INVENTION

The present invention relates to a mobile terminal technical field, and more particularly, to a multi-mode charging control method, a mobile terminal and a storage medium.

In a conventional mobile terminal, the energy storage device is often implemented as a lithium ion battery, which has advantages, such as a small size. Thus, the lithium ion battery is widely used in a mobile terminal. In addition, since the lithium ion battery does not have the memory function, it could be charged anytime.

However, the lithium ion battery in the conventional mobile terminal has its issue. That is, as long as the lithium ion battery is connected to a charger, the lithium ion battery is in the charging condition. But if the lithium ion battery is full, this will damage the lifetime of the lithium ion battery and might cause the explosion.

Therefore, the conventional technique needs to be developed and improved.

SUMMARY OF THE INVENTION

One objective of an embodiment of the present invention is to provide a multi-mode charging control method, a mobile terminal and a storage medium to solve the above-mentioned issue of keeping charging the lithium ion battery even when the battery is full.

According to an embodiment of the present invention, a multi-mode charging control method is disclosed. The multi-mode charging control method comprises: presetting a plurality of charging modes; connecting to a charger and receiving an operation command of a user, wherein the operation command comprises a mode selection command; setting and activating a timer according to the plurality of charging modes and the operation command; and turning off or on a charging function at a time appointed by the timer.

According to one embodiment of the present invention, the step of presetting the plurality of charging modes comprises:

presetting a first charging mode and a second charging mode;

wherein the operation command comprises:

a mode selection command and one of a charging time setting command and a battery target level setting command;

wherein the step of setting and activating the timer according to the plurality of charging modes and the operation command comprises:

if the first charging mode is selected, then setting and activating a first timer according to the charging time setting command in the operation command; and if the second charging mode is selected, then calculating a required charging time period according to the battery target level in the operation command and activating a second timer according to the calculated charging time period; and wherein the step of turning off or on the charging function at the time appointed by the timer comprises:

if it is in the first charging mode, then turning off the charging function at a time appointed by the first timer; and if it is in the second charging mode, then turning off the charging function at a time appointed by the second timer.

According to one embodiment of the present invention, the step of presetting the plurality of charging modes comprises:

presetting a third charging mode;

wherein the operation command comprises: a mode selection command and one of a charging time period setting command, a battery target level setting command and a charging start time setting command;

wherein the step of setting and activating the timer according to the plurality of charging modes and the operation command comprises:

if the third charging mode is selected, then setting and activating a third timer according to the charging start time setting command in the operation command;

wherein the step of turning off or on the charging function at the time appointed by the timer comprise:

if it is in the third charging mode, then turning on the charging function at a time appointed by the third timer.

According to one embodiment of the present invention, the step of presetting the plurality of charging modes comprises:

presetting a fourth charging mode;

wherein the operation command comprises: a mode selection command and one of a charging time period setting command, a battery target level setting command, a charging start time setting command and a charging finish time setting command;

wherein the step of setting and activating the timer according to the plurality of charging modes and the operation command comprises:

if the fourth charging mode is selected, then setting and activating a fourth timer according to the charging finish time setting command in the operation command;

wherein the step of turning off or on the charging function at the time appointed by the timer comprise:

if it is in the fourth charging mode, then turning off the charging function at a time appointed by the fourth timer.

According to one embodiment of the present invention, the step of presetting the plurality of charging modes comprises:

presetting a complex charging mode;

wherein the operation command comprises a complex command, comprising one of following combinations: a charging time period setting command and a charging start time setting command, the charging time period setting command and a charging finish time setting command, a battery target level setting command and the charging start time setting command, and the battery target level setting command and the charging finish time setting command;

wherein the step of setting and activating the timer according to the plurality of charging modes and the operation command comprises:

if the complex charging mode is selected, determining whether the complex command in the operation command comprises the charging start time setting command; and if the complex command in the operation command comprises the charging start time setting command, then activating a first complex timer and a second complex timer according to the complex command; otherwise, activating the second complex timer according to the complex command;

wherein the step of turning off or on the charging function at the time appointed by the timer comprises:

in a condition that both the first complex timer and the second complex timer are activated, turning on the charging function according to the first complex timer and turning off the charging function according to the second complex timer; and in a condition that only the second complex timer is activated, turning off the charging function according to the second complex timer.

According to an embodiment of the present invention, a mobile terminal is disclosed. The mobile terminal comprises a processor and a storage connected to the processor. The storage stores multi-mode charging control instructions and the processor executes the multi-mode charging control instructions to perform following steps: presetting a plurality of charging modes; connecting to a charger and receiving an operation command of a user, wherein the operation command comprises a mode selection command; setting and activating a timer according to the plurality of charging modes and the operation command; and turning off or on a charging function at a time appointed by the timer.

According to one embodiment of the present invention, the processor executes the multi-mode charging control instructions to perform following steps:

presetting a first charging mode and a second charging mode;

if the first charging mode is selected, then setting and activating a first timer according to a charging time setting command in the operation command; and if the second charging mode is selected, then calculating a required charging time period according to a battery target level in the operation command and activating a second timer according to the calculated charging time period;

if it is in the first charging mode, then turning off the charging function at a time appointed by the first timer; and if it is in the second charging mode, then turning off the charging function at a time appointed by the second timer.

According to one embodiment of the present invention, the processor executes the multi-mode charging control instructions to perform following steps:

presetting a third charging mode;

if the third charging mode is selected, then setting and activating a third timer according to a charging time start time setting command in the operation command; and if it is in the third charging mode, then turning on the charging function at a time appointed by the third timer.

According to one embodiment of the present invention, the processor executes the multi-mode charging control instructions to perform following steps:

presetting a fourth charging mode;

if the fourth charging mode is selected, then setting and activating a fourth timer according to a charging finish time setting command in the operation command; and if it is in the fourth charging mode, then turning off the charging function at a time appointed by the fourth timer.

According to one embodiment of the present invention, the processor executes the multi-mode charging control instructions to perform following steps:

presetting a complex charging mode;

if the complex charging mode is selected, determining whether the operation command comprises a chagrining start time setting command; if the operation command comprises the chagrining start time setting command, then setting and activating a first complex timer and a second complex timer according to the complex command; otherwise, then setting and activating only the second complex timer according to the complex command;

in a condition that both the first complex timer and the second complex timer are activated, turning on the charging function according to the first complex timer and turning off the charging function according to the second complex timer; and in a condition that only the second complex timer is activated, turning off the charging function according to the second complex timer.

According to an embodiment of the present invention, a storage medium is disclosed. The storage medium stores multi-mode charging control instructions executable by a processor to perform operations of:

presetting a plurality of charging modes;

connecting to a charger and receiving an operation command of a user, wherein the operation command comprises a mode selection command;

setting and activating a timer according to the plurality of charging modes and the operation command; and turning off or on a charging function at a time appointed by the timer.

According to one embodiment of the present invention, the operation of presetting the plurality of charging modes comprises:

presetting a first charging mode and a second charging mode;

wherein the operation command comprises:

a mode selection command and one of a charging time setting command and a battery target level setting command;

wherein the operation of setting and activating the timer according to the plurality of charging modes and the operation command comprises:

if the first charging mode is selected, then setting and activating a first timer according to the charging time setting command in the operation command; and if the second charging mode is selected, then calculating a required charging time period according to the battery target level in the operation command and activating a second timer according to the calculated charging time period; and wherein the step of turning off or on the charging function at the time appointed by the timer comprises:

if it is in the first charging mode, then turning off the charging function at a time appointed by the first timer; and if it is in the second charging mode, then turning off the charging function at a time appointed by the second timer.

According to one embodiment of the present invention, the operation of presetting the plurality of charging modes comprises:

presetting a third charging mode;

wherein the operation command comprises: a mode selection command and one of a charging time period setting command, a battery target level setting command and a charging start time setting command;

wherein the operation of setting and activating the timer according to the plurality of charging modes and the operation command comprises:

if the third charging mode is selected, then setting and activating a third timer according to the charging start time setting command in the operation command;

wherein the operation of turning off or on the charging function at the time appointed by the timer comprise:

if it is in the third charging mode, then turning on the charging function at a time appointed by the third timer.

According to one embodiment of the present invention, the operation of presetting the plurality of charging modes comprises:

presetting a fourth charging mode;

wherein the operation command comprises: a mode selection command and one of a charging time period setting command, a battery target level setting command, a charging start time setting command and a charging finish time setting command;

wherein the operation of setting and activating the timer according to the plurality of charging modes and the operation command comprises:

if the fourth charging mode is selected, then setting and activating a fourth timer according to the charging finish time setting command in the operation command;

wherein the operation of turning off or on the charging function at the time appointed by the timer comprise:

if it is in the fourth charging mode, then turning off the charging function at a time appointed by the fourth timer.

According to one embodiment of the present invention, the operation of presetting the plurality of charging modes comprises:

presetting a complex charging mode;

wherein the operation command comprises a complex command, comprising one of following combinations: a charging time period setting command and a charging start time setting command, the charging time period setting command and a charging finish time setting command, a battery target level setting command and the charging start time setting command, and the battery target level setting command and the charging finish time setting command;

wherein the operation of setting and activating the timer according to the plurality of charging modes and the operation command comprises:

if the complex charging mode is selected, determining whether the complex command in the operation command comprises the charging start time setting command; and if the complex command in the operation command comprises the charging start time setting command, then activating a first complex timer and a second complex timer according to the complex command; otherwise, activating the second complex timer according to the complex command;

wherein the operation of turning off or on the charging function at the time appointed by the timer comprises:

in a condition that both the first complex timer and the second complex timer are activated, turning on the charging function according to the first complex timer and turning off the charging function according to the second complex timer; and in a condition that only the second complex timer is activated, turning off the charging function according to the second complex timer.

An embodiment of the present invention is to provide a multi-mode charging control method, a mobile terminal and a storage medium. The multi-mode charging control method could allow a user to select a charging mode. And then, the mobile terminal could set and activate a timer according to the selected charging mode such that the timer is used to automatically turn on/off the charging function. In this way, the mobile terminal does not need to be in the charging state all the time. This efficiently solves the above-mentioned issue of keeping charging the lithium ion battery even when the battery is full, which may reduce the lifetime of the battery.

DESCRIPTION OF SPECIFIC EMBODIMENTS OF THE INVENTION

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

Embodiment 1

The lifetime of the lithium ion battery is measured by the charging cycles. The charging cycle represents the procedure from the battery is full to empty and from empty to full. For example, assume the storage cap of a lithium ion battery is 1000 mA and the user charges the battery every time when he consumes 100 mA until the battery is full. In this case, one charging cycle represents charging 10 times.

From the above, it could be seen that the lithium ion battery is more convenient than a traditional battery because the lithium ion battery does not need to be charged after the battery becomes entirely empty and does not need to stop charging after the battery becomes full. However, as long as the lithium ion battery is connected to the charger, the battery is being charged no matter the battery is full or not. But if the battery is full, this behavior will damage the lifetime of the battery and even lead to explosion. Therefore, in order to solve this issue, the present invention provides a multi-mode charging control method.

Figure 1:
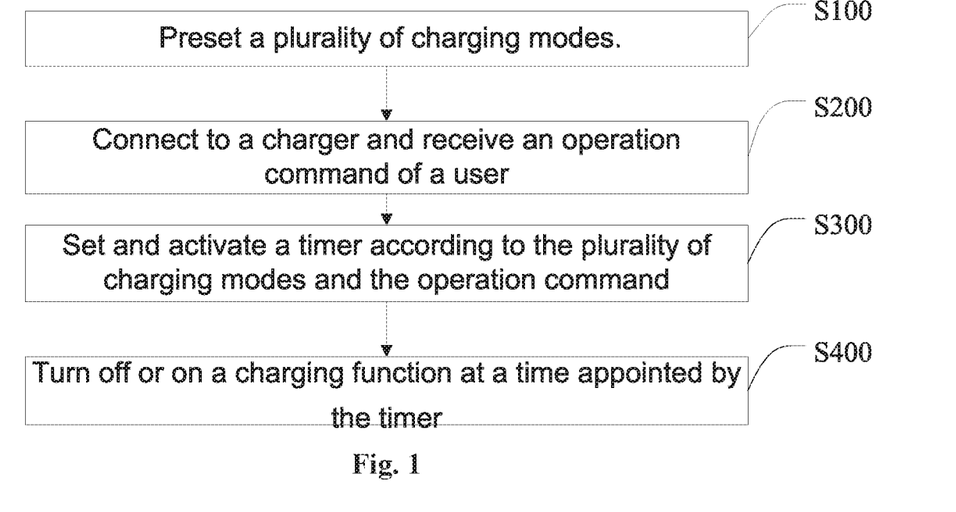
FIG. 1 is a flow chart of a multi-mode charging control method according to an embodiment of the present invention.

Please refer to FIG. 1. FIG. 1 is a flow chart of a multi-mode charging control method according to an embodiment of the present invention. As shown in FIG. 1, the multi-mode charging control method is disclosed. The multi-mode charging control method comprises:

S100: Presetting a plurality of charging modes.

In this embodiment, the charging modes could be a combination of two or more of the first charging mode, the second charging mode, the third charging mode, the fourth charting mode and the complex charging mode. At least two modes of the above-mentioned charging modes should be included in the combination. For example, the charging modes could consist of the first charging mode and the second charging mode, consist of the first charging mode and the third charging mode, or consist of the first charging mode, the second charging mode and the third charging mode. Preferably, the charging modes should include the first charging mode and the second charging mode. A better solution may include all five charging modes such that the user could have a better flexibility and thus this solution better fits the user's usage habit.

The first charging mode means that the user could determine the charging time period, which represents the time period from starting charge to completing charge. It could be achieved by: the user insert the charger to the charging port of the mobile terminal. The mobile terminal pops up the dialog box. The user inputs the charging time period (assume to be 3 hours) and then the mobile terminal sets and activates a timer. In addition, the lithium ion battery is charged until the charging time period (3 hours) passes. The timer sends a signal to a CPU (or another processor) such that the CPU turns off the charging function of the mobile terminal.

The second charging mode means that the user could determine the battery target level, which represents the target of the battery level after the charging process. For example, the battery level is 70% before charging. If the user wants to charge the battery to 100%, then the mobile terminal calculates the time period t1 for charging the battery to 100% without extra consumption. In addition, the mobile terminal also calculates the power consumption m during the time period t1 and thus calculates the charging time t2 for compensating for the power consumption m. In this way, the mobile terminal could calculate the required time period T=t1+t2. The actual implementation is similar to the first charging mode and thus further illustration is omitted for simplicity.

The third charging mode means that the user could determine the charging start time. That is, the user could determine when to start the charging function of the mobile terminal for charging the mobile terminal. For example, if the battery level is comparatively high before the user sleeps and the battery is charged to 100% at 2 AM, then the battery level might be less than 80% when the user gets up and thus cannot achieve the effect that the user wants. Therefore, the user could select the third charging mode to set the mobile terminal be charged from 3 AM until the user gets up. In this way, the battery level will be good enough when the user gets up. Furthermore, this could also avoid the mobile terminal be charged all the time during the user is sleeping and thus prevent the battery from being damaged.

The fourth charging mode means that the user could determine the charging finish time. That is, the user could determine when the mobile terminal turns off the charging function and finishes charging the battery. After the user inputs or selects the charging finish time, the mobile terminal could automatically adjust the charging current according to the difference between the current time and the charging finish time and the difference between the current battery level and the full level. In this way, the mobile terminal could be at the full battery level at the charging finish time and does not need to be overly charged. Similarly, it could be understood that the mobile terminal could determine whether to adjust the charging current according to the actual conditions.

The complex charging mode means that the user sets two or more charging parameters, including the charging time, the battery target level, the charging start time and the charging finish time.

For example, the user sets the charging time t3 and the charging start time t4. Then, the mobile terminal will start charging at time t4 and finish charging at the time t4+t3.

Similarly, the user sets the charging time t3 and the charging finish time t5. Then, the mobile terminal will start charging at time t5-t3 and finish charging at time t5.

Or, the user sets the charging time t3, for example, in units of minutes, the charging start time t4 and the battery target level m1. At this time, assume the current battery level is m2 and the power consumption is m3. Then, the mobile terminal will be charged at time t4 and finish charging at time t4+t3. During the charging period, the charging current will be controlled at p=(m1−m2−m3×t3)/t3.

Similarly, the user sets the charging time t3 (for example, in units of minutes), the charging finish time t5 and the battery target level m1. At this time, assume the current battery level is m2 and the power consumption is m3. Then, the mobile terminal will be charged at time t5-t3 and finish charging at time t5. During the charging period, the charging current will be controlled at p=(m1−m2−m3×t3)/t3.

Similarly, the user could set the charging start time t4 and battery target level m1 or the user could set the charging finish time t5 and the battery target level m1. It could be understood by one having ordinary skills in the art that there could be more combinations of the user's selections/settings. These changes fall within the scope of the present invention and further illustration is omitted here for simplicity.

S200: connecting to the charger and receiving the user operation command.

Here, the user operation command includes the mode selection command.

S300: setting and activating a timer according to the plurality of charging modes and the operation command.

S400: turning off or on the charging function at a time appointed by the timer.

In an embodiment of the present invention, the step of presetting the plurality of charging modes comprises: presetting the first charging mode and the second charging mode. The operation command comprises: a mode selection command and one of a charging time setting command and a battery target level setting command. The step of setting and activating the timer according to the plurality of charging modes and the operation command comprises: if the first charging mode is selected, then setting and activating a first timer according to the charging time setting command in the operation command; and if the second charging mode is selected, then calculating a required charging time period according to the battery target level in the operation command and activating a second timer according to the calculated charging time period. The step of turning off or on the charging function at the time appointed by the timer comprises: if it is in the first charging mode, then turning off the charging function at a time appointed by the first timer; and if it is in the second charging mode, then turning off the charging function at a time appointed by the second timer.

In an embodiment of the present invention, the step of presetting the plurality of charging modes comprises: presetting the third charging mode. The operation command comprises: the mode selection command and one of the charging time period setting command, the battery target level setting command and the charging start time setting command. The step of setting and activating the timer according to the plurality of charging modes and the operation command comprises: if the third charging mode is selected, then setting and activating a third timer according to the charging start time setting command in the operation command. The step of turning off or on the charging function at the time appointed by the timer comprise: if it is in the third charging mode, then turning on the charging function at a time appointed by the third timer.

In an embodiment of the present invention, the step of presetting the plurality of charging modes comprises: presetting the fourth charging mode. The operation command comprises: the mode selection command and one of the charging time period setting command, the battery target level setting command, the charging start time setting command and the charging finish time setting command. The step of setting and activating the timer according to the plurality of charging modes and the operation command comprises: if the fourth charging mode is selected, then setting and activating a fourth timer according to the charging finish time setting command in the operation command. The step of turning off or on the charging function at the time appointed by the timer comprise: if it is in the fourth charging mode, then turning off the charging function at a time appointed by the fourth timer.

In an embodiment of the present invention, the step of presetting the plurality of charging modes comprises: presetting the complex charging mode. The operation command comprises a complex command, comprising one of following combinations: the charging time period setting command and the charging start time setting command, the charging time period setting command and the charging finish time setting command, the battery target level setting command and the charging start time setting command, and the battery target level setting command and the charging finish time setting command. The step of setting and activating the timer according to the plurality of charging modes and the operation command comprises: if the complex charging mode is selected, determining whether the complex command in the operation command comprises the charging start time setting command; if the complex command in the operation command comprises the charging start time setting command, then activating a first complex timer and a second complex timer according to the complex command; otherwise, activating the second complex timer according to the complex command. The step of turning off or on the charging function at the time appointed by the timer comprises: in a condition that both the first complex timer and the second complex timer are activated, turning on the charging function according to the first complex timer and turning off the charging function according to the second complex timer; and in a condition that only the second complex timer is activated, turning off the charging function according to the second complex timer.

Embodiment 2

Figure 2:
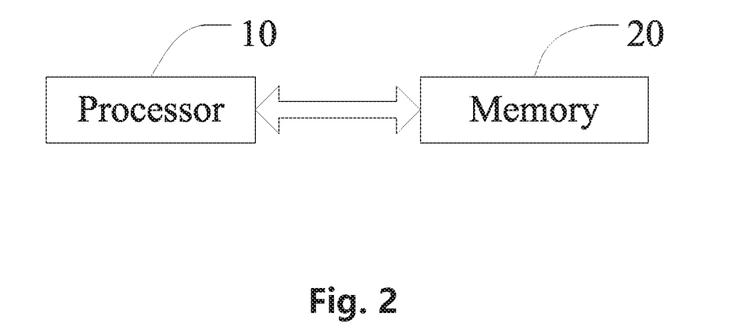
FIG. 2 is a diagram of a mobile terminal according to an embodiment of the present invention.

A mobile terminal is disclosed according to an embodiment of the present invention. As shown in FIG. 2, the mobile terminal could be a cell phone (or a tablet). The mobile terminal comprises a processor 10 and a storage device 20 connected to the processor 10. The storage device 20 stores multi-mode charging control instructions. The processor 10 executes the multi-mode charging control instructions to perform the following steps:

presetting a plurality of charging modes;

connecting to a charger and receiving an operation command of a user, wherein the operation command comprises a mode selection command;

setting and activating a timer according to the plurality of charging modes and the operation command; and turning off or on a charging function at a time appointed by the timer.

The processor executes the multi-mode charging control instructions to perform following steps:

presetting a first charging mode and a second charging mode;

if the first charging mode is selected, then setting and activating a first timer according to a charging time setting command in the operation command; and if the second charging mode is selected, then calculating a required charging time period according to a battery target level in the operation command and activating a second timer according to the calculated charging time period;

if it is in the first charging mode, then turning off the charging function at a time appointed by the first timer; and if it is in the second charging mode, then turning off the charging function at a time appointed by the second timer.

The processor executes the multi-mode charging control instructions to perform following steps:

presetting a third charging mode;

if the third charging mode is selected, then setting and activating a third timer according to a charging time start time setting command in the operation command; and if it is in the third charging mode, then turning on the charging function at a time appointed by the third timer.

The processor executes the multi-mode charging control instructions to perform following steps:

presetting a fourth charging mode;

if the fourth charging mode is selected, then setting and activating a fourth timer according to a charging finish time setting command in the operation command; and if it is in the fourth charging mode, then turning off the charging function at a time appointed by the fourth timer.

The processor executes the multi-mode charging control instructions to perform following steps:

presetting a complex charging mode;

if the complex charging mode is selected, determining whether the operation command comprises a chagrining start time setting command; if the operation command comprises the chagrining start time setting command, then setting and activating a first complex timer and a second complex timer according to the complex command; otherwise, then setting and activating only the second complex timer according to the complex command;

in a condition that both the first complex timer and the second complex timer are activated, turning on the charging function according to the first complex timer and turning off the charging function according to the second complex timer; and in a condition that only the second complex timer is activated, turning off the charging function according to the second complex timer.

Embodiment 3

A storage medium is disclosed. The storage medium stores multi-mode charging control instructions. The multi-mode charging control instructions is executed by the processor 10 to perform the above-mentioned multi-mode charging control method.

To sum up, the present invention is to provide a multi-mode charging control method, a mobile terminal and a storage medium. The method comprises: presetting a plurality of charging modes; connecting to a charger and receiving an operation command of a user, wherein the operation command comprises a mode selection command; setting and activating a timer according to the plurality of charging modes and the operation command; and turning off or on a charging function at a time appointed by the timer. The multi-mode charging control method could allow a user to select a charging mode. And then, the mobile terminal could set and activate a timer according to the selected charging mode such that the timer is used to automatically turn on/off the charging function. In this way, the mobile terminal does not need to be in the charging state all the time. This efficiently solves the above-mentioned issue of keeping charging the lithium ion battery even when the battery is full, which may reduce the lifetime of the battery.

Embodiment 4

Figure 3:
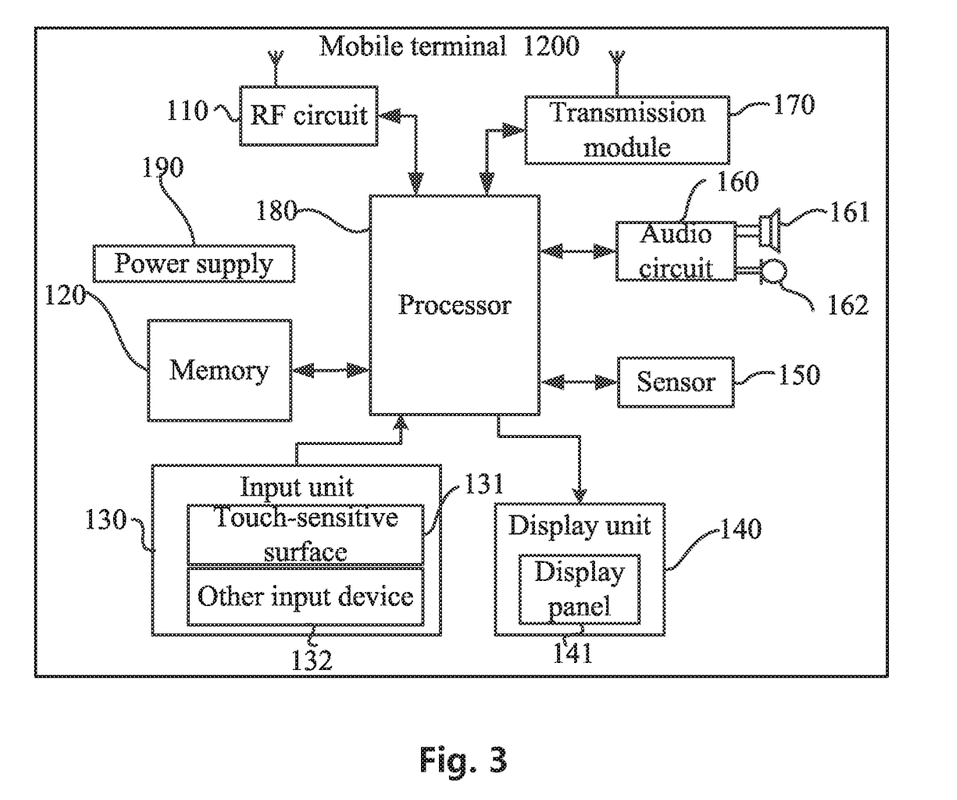
FIG. 3 is a functional block diagram of a mobile terminal according to an embodiment of the present invention.

FIG. 3 is a functional block diagram of a mobile terminal according to an embodiment of the present invention. The mobile terminal could be used to implement the above-mentioned multi-mode charging control method. The mobile terminal 1200 could be a smart phone or a tablet.

As shown in FIG. 3, the mobile terminal 1200 may comprise components, such as a radio frequency (RF) circuit 110, a memory 120 including one or more (only one is shown in the figure) computer-readable storage media, an input unit 130, a display unit 140, a sensor 150, an audio circuit 160, a transmission module 170, a processor 180 including one or more (only one is shown in the figure) processing cores, and a power supply 190, etc. Those skilled in the art would understand that the mobile terminal 1200 is not limited to the structure of the mobile terminal 1200 shown in FIG. 3. The mobile terminal 1200 may comprise more or less components than those illustrated in the figure, or some components may be combined, or the mobile terminal 1200 may have different component arrangements.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high speed random access memory, and may also include a non-volatile memory, such as at least one magnetic disk storage device, a flash memory device, or another volatile solid-state storage device. Correspondingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and other input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 1200. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 3, the touch-sensitive surface 131 and the display panel 141 are used as two separate parts to implement input and output functions, in some embodiments, the touch-sensitive surface 131 and the display panel 141 may be integrated to implement the input and output functions.

The terminal 1200 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1200 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the terminal 1200 are not further described herein.

The audio circuit 160, a loudspeaker 161, and a microphone 162 may provide audio interfaces between the user and the terminal 1200. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

The terminal 1200 may help, by using the transmission module 170 (e.g. Wi-Fi module), a user to receive and send an e-mail, browse a webpage, and access stream media, and the like, which provides wireless broadband Internet access for the user. Although FIG. 3 shows the transmission module 170, it may be understood that, the wireless communications unit is not a necessary component of the terminal 1200, and can be ignored according to demands without changing the scope of the essence of the present disclosure.

The processor 180 is a control center of the terminal 1200, and connects various parts of the terminal by using various interfaces and lines. By running or executing the software program and/or module stored in the memory 120, and invoking data stored in the memory 120, the processor 180 performs various functions and data processing of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The terminal 1200 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

The mobile terminal 1200 may further comprise a camera (such as a front camera, a rear camera), a Bluetooth module, and the like, and a description in this regard is not provided. In greater detail, a display unit of the mobile terminal is a touch screen display according to the present embodiment. The mobile terminal further comprises a memory and one or more programs. The one or one or more programs are stored in the memory, and are configured to be executed by one or more processors to perform the above-mentioned multi-mode charging control method.

Above are embodiments of the present invention, which does not limit the scope of the present invention. Any modifications, equivalent replacements or improvements within the spirit and principles of the embodiment described above should be covered by the protected scope of the invention.

What is claimed is:

1. A mobile terminal, comprising a processor and a storage device connected to the processor, wherein the storage device stores multi-mode charging control instructions and the processor executes the multi-mode charging control instructions to perform following operations:
   presetting a first charging mode, and a second charging mode, and a third charging mode;
   if the first charging mode is selected, setting and activating a first timer according to a charging time setting command in an operation command;
   if the second charging mode is selected, calculating a required charging time period according to a battery target level in the operation command and activating a second timer according to the calculated charging time period;
   if the third charging mode is selected, then setting and activating a third timer according to a start time of charging in the operation command;
   determining a charging current according to the required charging time period; and
   if it is in the first charging mode, turning off a charging function at a time appointed by the first timer;
   if it is in the second charging mode, turning off the charging function at a time appointed by the second timer; and
   if it is in the third charging mode, turning on the charging function to charge according to the charging current at a time appointed by the third timer.

2. The mobile terminal of claim 1, wherein the processor executes the multi-mode charging control instructions to perform following operations:
   presetting a fourth charging mode;
   if the fourth charging mode is selected, then setting and activating a fourth timer according to a charging finish time setting command in the operation command; and
   if it is in the fourth charging mode, then turning off the charging function at a time appointed by the fourth timer.

3. The mobile terminal of claim 2, wherein the processor executes the multi-mode charging control instructions to perform following operations:
   presetting a complex charging mode;
   if the complex charging mode is selected, determining whether the operation command comprises a chagrining start time setting command; if the operation command comprises the chagrining start time setting command, then setting and activating a first complex timer and a second complex timer according to the complex command; otherwise, then setting and activating only the second complex timer according to the complex command.

4. The mobile terminal of claim 3, wherein the processor executes the multi-mode charging control instructions to perform following operations:
   in a condition that both the first complex timer and the second complex timer are activated, turning on the charging function according to the first complex timer and turning off the charging function according to the second complex timer; and
   in a condition that only the second complex timer is activated, turning off the charging function according to the second complex timer.

5. A storage medium, storing multi-mode charging control instructions executable by a processor to perform operations of:

presetting a plurality of charging modes that include a first charging mode and a second charging mode, and a third charging mode;

if the first charging mode is selected, setting and activating a first timer according to a charging time setting command in an operation command;

if the second charging mode is selected, calculating a required charging time period according to a battery target level in the operation command and activating a second timer according to the calculated charging time period;

if the third charging mode is selected, then setting and activating a third timer according to a start time of charging in the operation command;

determining a charging current according to the required charging time period; and if it is in the first charging mode, turning off a charging function at a time appointed by the first timer;

if it is in the second charging mode, turning off the charging function at a time appointed by the second timer; and if it is in the third charging mode, turning on the charging function to charge according to the charging current at a time appointed by the third timer.

6. The storage medium of claim 5, wherein the operation of presetting the plurality of charging modes comprises:

presetting a fourth charging mode;

wherein the operation command comprises: a mode selection command and one of a charging time period setting command, a battery target level setting command, a charging start time setting command and a charging finish time setting command;

wherein the operation of setting and activating the timer according to the plurality of charging modes and the operation command comprises:

if the fourth charging mode is selected, then setting and activating a fourth timer according to the charging finish time setting command in the operation command;

wherein the operation of turning off or on the charging function at the time appointed by the timer comprise:

if it is in the fourth charging mode, then turning off the charging function at a time appointed by the fourth timer.

7. The storage medium of claim 5, wherein the operation of presetting the plurality of charging modes comprises:

presetting a complex charging mode;

wherein the operation command comprises a complex command, comprising one of following combinations: a charging time period setting command and a charging start time setting command, the charging time period setting command and a charging finish time setting command, a battery target level setting command and the charging start time setting command, and the battery target level setting command and the charging finish time setting command;

wherein the operation of setting and activating the timer according to the plurality of charging modes and the operation command comprises:

if the complex charging mode is selected, determining whether the complex command in the operation command comprises the charging start time setting command; and if the complex command in the operation command comprises the charging start time setting command, then activating a first complex timer and a second complex timer according to the complex command; otherwise, activating the second complex timer according to the complex command.

8. The storage medium of claim 5, wherein the operations further comprise comprises:

in a condition that both the first complex timer and the second complex timer are activated, turning on the charging function according to the first complex timer and turning off the charging function according to the second complex timer; and in a condition that only the second complex timer is activated, turning off the charging function according to the second complex timer.

* * * * *